May 15, 1951          A. H. LAMB          2,552,981
ELECTRICAL TESTING APPARATUS
Filed Feb. 13, 1947          3 Sheets-Sheet 1
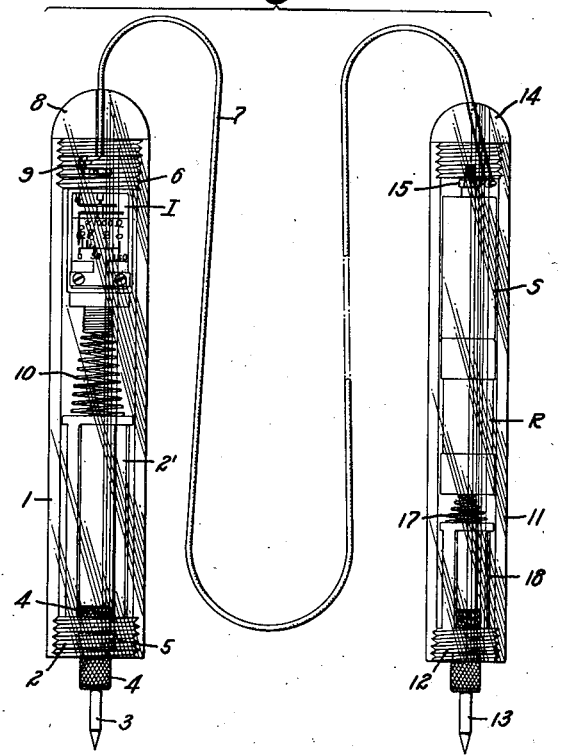
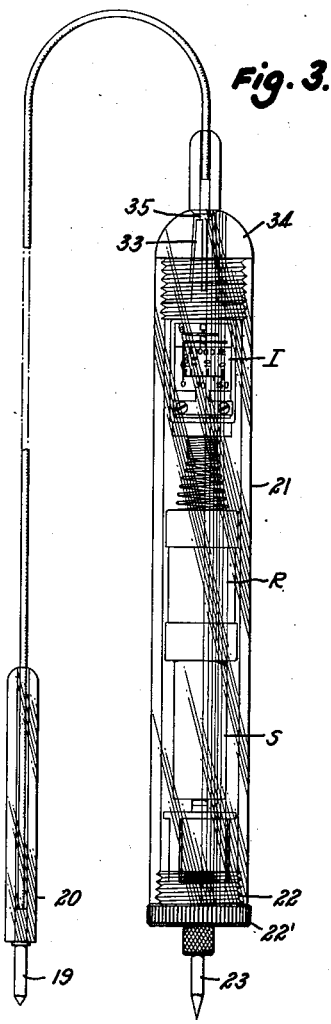
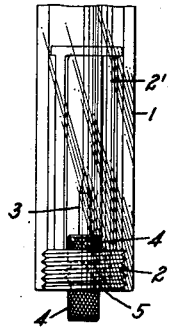
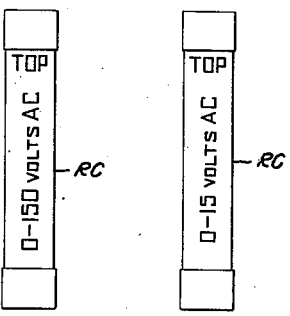
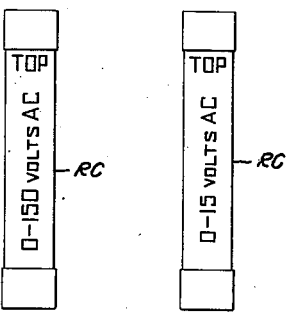
Inventor:
Anthony H. Lamb,
By Pierce, Scheffler Parker,
Attorneys.

May 15, 1951     A. H. LAMB     2,552,981
ELECTRICAL TESTING APPARATUS
Filed Feb. 13, 1947     3 Sheets-Sheet 2
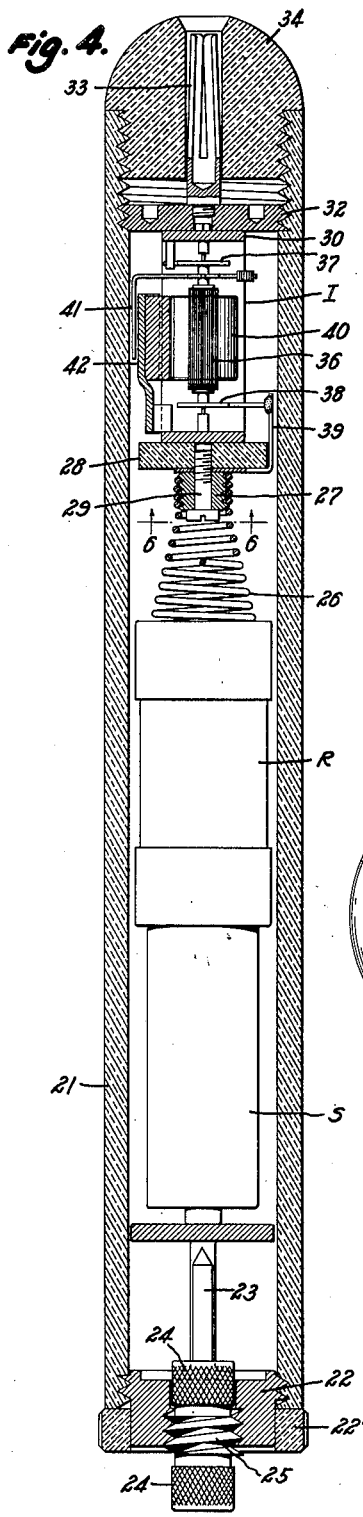
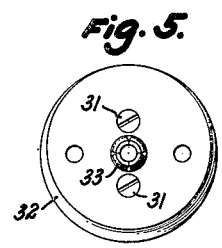
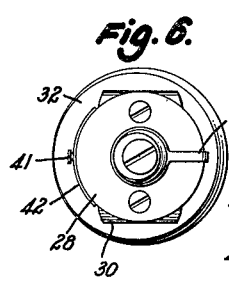
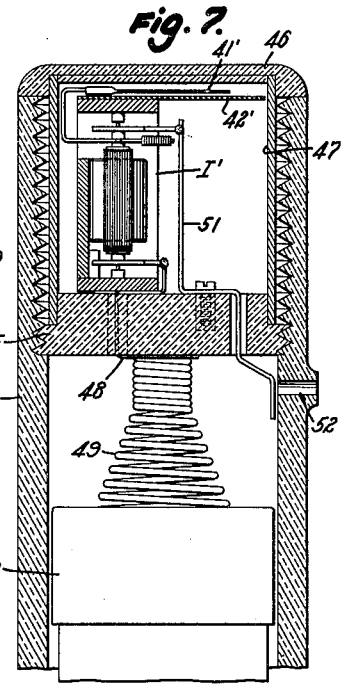
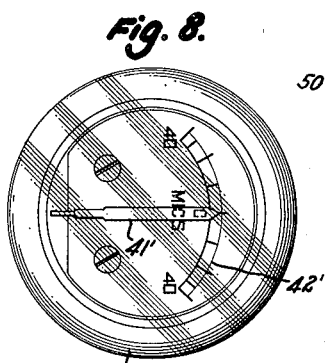
Inventor:
Anthony H. Lamb,
By Pierce, Scheffler & Parker,
Attorneys.

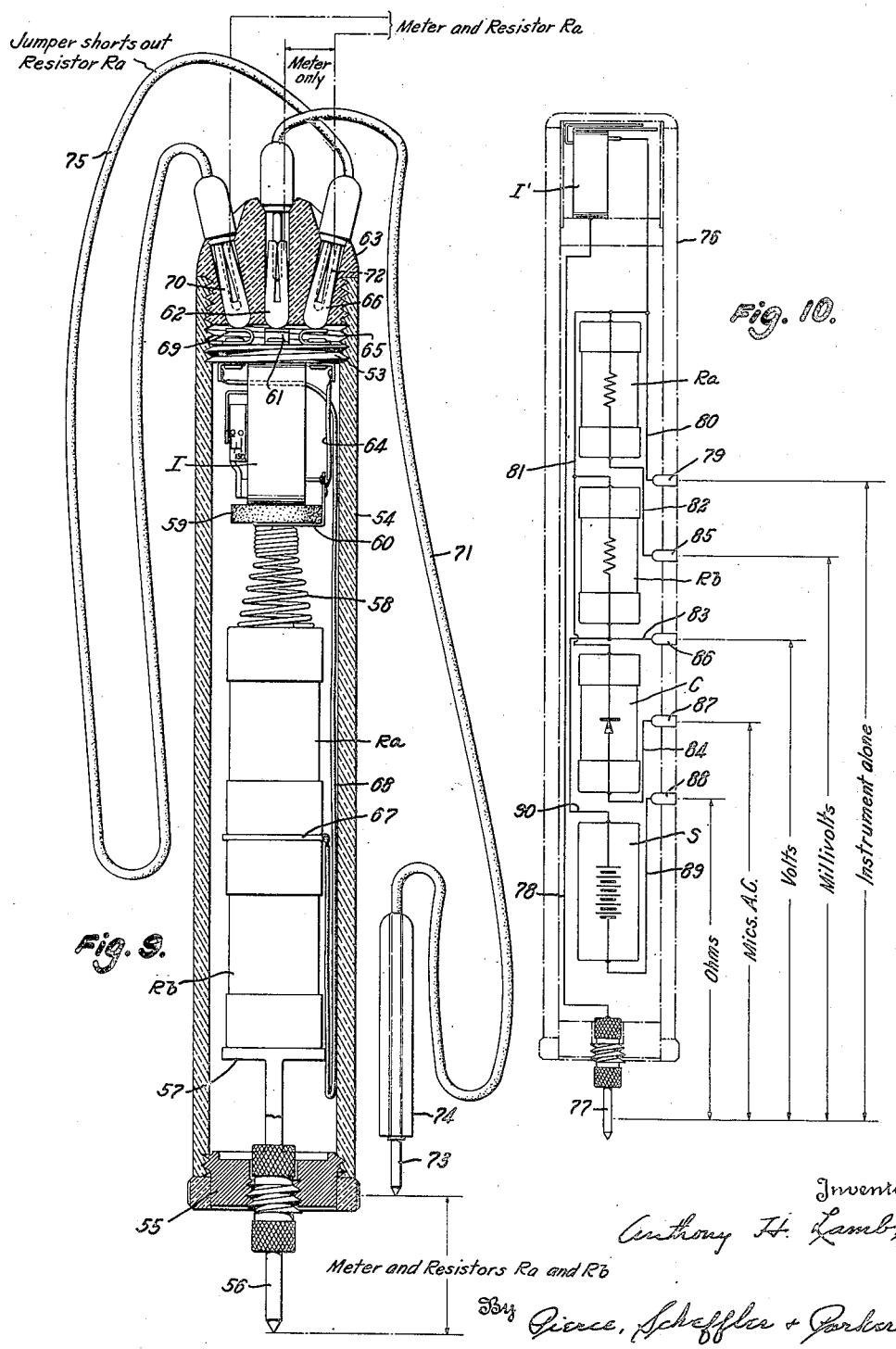

Patented May 15, 1951

2,552,981

UNITED STATES PATENT OFFICE 2,552,981

ELECTRICAL TESTING APPARATUS

Anthony H. Lamb, Hillside, N. J., assignor to Weston Electrical Instrument Corporation, Newark, N. J., a corporation of New Jersey Application February 13, 1947, Serial No. 728,315

13 Claims. (Cl. 171—95)

This invention relates to electrical testing apparatus and more particularly to portable apparatus for checking the continuity and/or measuring the voltage, current or resistance of an electrical circuit.

A conventional type of portable testing apparatus includes a measuring instrument and one or more dry cells within a casing which is placed on a shelf, table or other support, and a pair of leads terminating in test prods for engagement with points on the circuit under examination. It is usually impossible to place the portable casing in such position that both the instrument and the circuit under test can be viewed at the same time, and the checking of the circuit then requires considerable time as the operator must turn his head back and forth continuously to set the prods and to take the readings. Damage occurs frequently as the casing may be pulled from its support or the prods may slip, when the operator turns to take a reading, and create a short circuit or impose an excessive voltage upon the instrument.

Objects of the present invention are to provide electrical testing apparatus which eliminates the separate instrument casing of the prior constructions, and in which all of the electrical elements are located on or within the insulating handles of the test prods. Objects are to provide electrical testing apparatus of small size and highly portable character which may be readily adjusted to test or measure various electrical factors such as circuit continuity, voltage, current or resistance. More specifically, an object is to provide electrical testing apparatus in which a miniature measuring instrument is mounted within the handle of one of the test prods and other circuit elements, such as dry cells, resistances and/or rectifiers, may be located in the same or in the other handle in any desired combination in accordance with the particular test or measurement which is to be made. Further objects are to provide electrical testing apparatus in which various circuit elements are interchangeably received in the handles of the test prods, and any one of a number of circuit connections may be established to adapt the measuring instrument for different types of tests and/or different ranges of measurement.

These and other objects and advantages of the invention will be apparent from the following specification when taken with the accompanying drawings in which:

Fig. 1 is an elevation of an electrical testing apparatus embodying the invention;

Fig. 2 is a fragmentary elevation with parts in section, showing a test prod in reversed or inoperative position;

Figs. 2a and 2b are elevations of other types of circuit elements which may be placed in the test prod handle or handles;

Fig. 3 is an elevation of another embodiment of the invention;

Fig. 4 is a substantially longitudinal section, on a larger scale, of the hollow handle and the measuring circuit elements housed within the same.

Fig. 5 is a top view of the mounting washer by which the instrument is supported within the handle;

Fig. 6 is a bottom view of the instrument assembly as seen on the sectional plane indicated by line 6—6 of Fig. 4;

Fig. 7 is a fragmentary sectional view, also on an enlarged scale, of another embodiment in which the measuring instrument scale extends across the end of one of the test prod handles;

Fig. 8 is an end elevation of the test prod handle and measuring instrument within the same;

Fig. 9 is an elevation, partly in longitudinal section, of a multi-range embodiment of the invention; and Fig. 10 is a schematic view of a multi-purpose measuring instrument embodying the invention.

In Figs. 1 and 2 of the drawings, the reference numeral 1 identifies the cylindrical casing of a handle which is closed at its lower end by a metal plug 2 having a central bore in which the test prod 3 is threaded. The casing is of insulating material, and preferably a transparent plastic, and the metal plug 2 is set back from the end of the casing 1 to prevent an inadvertent electrical contact between the plug 2 and a circuit element other than that engaged by the test prod 3. The prod 3 has cylindrical knurled portions 4 at opposite sides of, and of somewhat smaller diameter than the threaded portion 5, to facilitate the reversal of the prod 3, as shown in Fig. 2, to prevent damage to or from the sharp point of the prod 3 during transportation of the test apparatus. As shown in Fig. 2, the relatively long pointed end of the prod 3 lies within the skeleton extension 2' of the metal plug 2 when in reversed position.

A miniature electrical measuring instrument I, preferably of the general type described and claimed in my copending application Serial No. 584,759, filed March 26, 1945, is supported within the upper end of the casing 1. Measuring instruments of high sensitivity may be manufactured in small sizes, for example of a diameter to fit within a casing 1 having an outside diameter of 1 inch, according to my prior invention, and the instrument scale may be graduated in one or more of the electrical quantities of current, voltage and resistance. The instrument I is secured to and below a disk 6 which is threaded into the upper end of the casing 1, and one circuit connection to the instrument is a flexible lead 7 which extends through a bore in the end cap 8 and is secured to the disk 6 by a screw 9. The other circuit connection is through a spring 10 which is secured to the instrument assembly and bears upon the extension 2' of the metal plug 2.

The cylindrical casing 11 of a second prod handle is closed at its lower end by a plug 12 in which a test prod 13 is reversibly mounted in in the manner as described above with respect to the test prod 3. The casing 11 is of insulating material and may be opaque but preferably, as illustrated, is transparent.

The lead 7 extends through the threaded cap 14 of the casing 11, and is secured to the cap 14 by a terminal stud 15. A number of circuit elements are supported within the casing 11 and electrically connected between the lead terminal 15 and the test prod 13. As shown in Fig. 1, one circuit element is a dry cell or current source S and another is a resistance R of such value as to adapt the apparatus for continuity tests and the measurement of resistance values. One terminal of the dry cell S is held in contact with the lead terminal 15 by a spring 17 which is seated between the lower contact of the resistance R and the skeleton extension 18 of the end cap 12.

The described apparatus is employed in the customary manner to measure the resistance between the points of an electrical circuit which are engaged by the prods 3 and 13. Both of the prods may be moved from point to point, or one or the prods may be left at one reference point, for example the chassis upon which the electrical circuit is mounted. The checking of circuit resistances can proceed rapidly as the prod 3 and the instrument I are continuously in substantially the same line of sight and at approximately the same distance from the operator's eyes during the testing. Fatigue and eye strain are reduced to a minimum in the case of tests that extend over a long period, which may be the entire work day for an inspector in a factory, as the close association of the instrument I and test prod 3 eliminates the continuous turning of the head and the alternate focussing of the eyes at different distances which were characteristic of operations with the prior testing apparatus.

The apparatus is small and of light weight, and may conveniently be carried in the pocket or in a small case. The prod handles are not unduly large and awkward, but may be of the order of 1 inch in diameter when the instrument I is a "miniature" measuring instrument such as described in the copending application.

All of the essential circuit elements of the testing apparatus may be located in the hollow handle of one of the test prods, and the other prod 19 may be mounted in a handle or insulating sleeve 20 which is of but slightly larger diameter than the prod, see Fig. 3. The cylindrical shell 21 of the hollow prod handle is of sufficient length to receive an instrument I and such other electrical elements, for example a resistor R and dry cell S, as may be required to adapt the instrument for a particular test or measurement. The lower end of the shell 21 is closed by a threaded plug 22 having an outer flange or rim 22' of insulating material to prevent an inadvertent shorting of the prod 23 upon some point of the circuit adjacent the particular point engaged by the prod. The plug 22 may be removed to permit the substitution of other components for the cell S and/or resistor R, and the prod 23 preferably has milled cylindrical portions 24 at opposite sides of a threaded section 25 to permit a reversal of the prod into inoperative position, see Fig. 4.

A conical spring 26 which maintains a good contact engagement between adjacent circuit elements has closely wound upper turns threaded upon a bushing 27 which is secured to the insulating base 28 of the instrument by a stud 29. The soft iron yoke 30 of the instrument I is secured by screws 31, see Fig. 5, to the metallic washer 32 which is threaded into the upper end of the casing 21 and has secured thereto a resilient socket 33 which extends axially through a bore of the insulating end cap 34 of the shell 21. The pin terminal 35 of the flexible lead from the test prod 19 is plugged into the socket 33 to complete the assembly of the test apparatus.

The electrical connections to the moving coil 36 of the instrument I include the springs 37, 38 which are anchored, respectively, on the yoke 30 and on the strap or bracket 39 which is clamped between the bushing 27 and the insulating base 28. The core 40 of the instrument is a permanent magnet and the angular displacement of the coil 36, and of its pointer 41 with respect to a scale plate 42, depends upon the magnitude of the current through the coil 36.

There is a definite limit to the maximum current which may pass through the instrument I, but the measuring range of the testing apparatus and the type of test or measurement may be varied by a selection of the values and the character of the circuit elements which are located in the test prod handle or handles. As illustrated in Figs. 1, 3 and 4, a resistor R and dry cell S are connected in series with the instrument I, and these embodiments of the invention are adapted for continuity tests and for the measurement of resistance values. The illustrated instrument scale plates are provided with graduations of microamperes and of ohms, and the testing apparatus may be converted to measure direct current values, in place of resistance values, by removing the dry cell S and substituting a simple connector unit of substantially the same length. Alternatively, the apparatus may be employed for alternating current measurements by removing the resistor R and cell S, and substituting a "rectifier" unit RC, see Figs. 2a and 2b, which includes a crystal rectifier and a resistor of appropriate value for the measuring range indicated by a legend or code marking on the cartridge.

As shown in Figs. 7 and 8, an instrument I' may be employed which has a pointer 41' movable over a scale plate 42' arranged in a plane transverse to the axis of the cylindrical probe handle 44. The instrument is mounted upon an insulating disk 45 which is threaded into the end of the casing, and the outer end of the casing is closed by a transparent cap 46 on the end of a sleeve 47 which has a snug fit upon the reduced diameter upper portion of the disk 45. One spring or instrument coil terminal is connected by a strap 48 to the spring 49 which is attached to the disk 45 and bears on a cartridge or circuit element 50 of a desired character, and the other spring or coil terminal is connected to a strap 51 which is mounted on the disk 45 and has a lower end in line with an opening 52 through the casing wall in which may be inserted the pin terminal of a flexible lead, not shown.

Other embodiments of the invention, as shown in Figs. 9 and 10, include a plurality of pin sockets in which terminal pins of leads may be inserted in various combinations to permit multiple-range or multiple-purpose measurements without change of the circuit elements located within a handle of a test prod. The apparatus shown in Fig. 9 may be used for measurements of the same type in four ranges, and the apparatus shown in Fig. 10 provides for measurements of different type, and measurements of one type in different ranges.

In the embodiment illustrated in Fig. 9, the instrument I may be substantially identical with the instrument which is shown in Fig. 4, and it is secured to an insulating disk 53 which is threaded into the upper end of the transparent plastic casing 54 of a probe handle. The lower end of the casing is closed by a threaded plug 55 in which a probe 56 is mounted; these parts being preferably similar to the corresponding parts of the previously described embodiments of the invention. Two resistors Ra, Rb, preferably of different values, are serially arranged between the skeleton extension 57 of the end plug 55 and a spring 58 which is secured to the insulating base disk 59 of instrument I and conductively connected to one terminal of the instrument I by a strap 60. The other terminal of the instrument has a spring contact 61 secured thereto for engagement with the lower end of a resilient socket 62 in an end cap 63 which is threaded into the end of the casing 54. A lead 64 extends from the terminal strap 60 to a spring contact 65 which is mounted on the disk 53 to engage a resilient socket 66 carried by the end cap 63. The resistors Ra, Rb are connected through a metal washer or disk 67 from which a flexible lead 68 extends to a contact spring 69 which is mounted on the insulating disk 53 to engage the end of a third socket 70 which is carried by the end cap 63. The lead 68 is of such length that the contact disk 67 may be removed from the casing 53 to permit replacement of the resistor Ra. A flexible lead 71 has a pin 72 at one end for insertion in one of the sockets, and terminates at its other end at the pin or probe contact 73 which is carried by an insulating sleeve or handle 74. A jumper or flexible lead 75 terminating in pin contacts is provided for altering the measuring range by shunting one of the resistors or alternatively by excluding the other resistor from the measuring circuit.

When the pin contact 72 is seated in the socket 62 and the jumper 75 is removed, both resistors are in series with the instrument I to adapt the apparatus for measurements in a high range between the probe contacts 56 and 73. With the pin contacts of the jumper 75 inserted in sockets 65 and 70, as illustrated in Fig. 9, a lower measuring range is provided between probe contacts 56 and 73 since the resistance Ra is shunted by the jumper 75. Alternatively, a second low or intermediate measuring range may be obtained between leads 71 and 75 by inserting one pin of lead 75 in the socket 70, thereby connecting only the resistor Ra in series with the instrument I between the leads 71 and 75. When the lead 75 is connected to the socket 62, and lead 71 is connected as shown to socket 66, both resistors are excluded from the measuring circuit and the instrument I is directly connected between the leads 71, 75 to provide a low measuring range. As in the previously described embodiments, one or both of the resistors Ra, Rb may be replaced by the other resistors to shift one or more of the higher measuring ranges to other values. The several circuit combinations which may be established to provide different measuring ranges are indicated by the legends applied to Fig. 9.

Additional measuring ranges and/or additional types of measurements may be had by increasing the number and/or types of circuit elements carried in the handle or handles of the probes, and providing additional sockets into which the leads may be inserted. As shown schematically in Fig. 10, the measuring instrument I' is located in the upper end of the cylindrical probe handle 76 in the manner illustrated in Fig. 7, and the circuit elements within the handle include two resistors Ra, Rb, a crystal rectifier C, and a dry cell or current source S. One terminal of the instrument I' is connected to the probe 77 by a lead 78, and the other instrument terminal is connected to a pin socket 79 by a lead 80. The socket is also connected to one end of each resistor Ra, Rb and of the rectifier C by a common lead 81, and the other ends of these circuit elements are connected by individual leads 82, 83 and 84 to pin sockets 85, 86 and 87, respectively. The dry cell S is connected between a pin socket 88 and the lead 83 of pin socket 86 86 by leads 89, 90, respectively. The circuit connections within the probe handle may be established in any convenient or desired manner which permits the removal and replacement of any of the circuit elements, for example by coupling washers and flexible leads such as illustrated in Fig. 9, or the cylindrical case 76 may be made in two or more sections to facilitate replacement of the circuit elements.

The instrument I' may be connected across points in a circuit under test by inserting the pin end of a test prod lead in the pin socket 79, and contacting the circuit points with the test prod and the probe 77. This connection and the several measurements which may be made when the test prod is connected to other pin sockets are indicated by the legends applied to Fig. 10.

Embodiments of the invention are of exceedingly small size and bulk, as compared with prior portable apparatus for making the same tests or measurements, since the test prod handles are comparable in size to the so-called "pencil" flashlights, i. e. they may have a length of only a few inches and a diameter of one inch or less. A minimum size is possible when the measuring instrument and all circuit elements are located in a single probe handle, but the invention is not limited to constructions of the minimum size consistent with stability in use and economy in manufacture. It may be desirable to employ measuring instruments of substantially more than minimum size when the testing apparatus is to be used continuously for long periods. The longer scale plate of a larger instrument will reduce eye strain for such uses, for example when the testing apparatus is used throughout the work day by an inspector in a factory manufacturing radio or television apparatus.

It is therefore to be understood that the invention is not restricted to the apparatus herein illustrated and described as various changes may be made in the size and shape of the parts, and in the character of the circuit elements without departing from the spirit and scope of the invention as set forth in the following claims.

I claim:

1. Electrical testing apparatus comprising a hollow prod handle, a mounting plate removably disposed within said handle at one end thereof, an electrical measuring instrument of the permanent magnet core-movable coil type depending from said mounting plate, said instrument including a sub-base of insulating material, a coiled spring carried by and depending from said sub-base, an electrical connection between the upper end of said spring and one side of said instrument coil, a circuit element removably disposed within said handle and engageable with the lower end of said spring, a removable end closure for the other end of said handle, a prod carried by said closure member, the recited arrangement being such that when said closure member is attached to said handle a series electrical circuit is established from said coil end through said spring and circuit element to said prod, and electrical connecting means including a flexible lead extending from the other side of said instrument coil to a second prod.

2. Testing apparatus as defined in claim 1 wherein said end closure member has a threaded bore and said first test prod has a blunt end and a point end connected by a threaded portion engageable in said bore, whereby said prod may be reversely arranged to project either its point end or blunt end.

3. Electrical testing apparatus as defined in claim 1 wherein the end of said flexible lead opposite the prod end terminates in a contact pin and said prod handle includes a cooperative pin socket electrically connected to the said other side of the instrument coil.

4. Electrical testing apparatus as defined in claim 3 wherein said socket is carried by said mounting plate.

5. Electrical testing apparatus as defined in claim 1 wherein said mounting plate is of insulating material and said connecting means includes a contact pin at the head of said flexible lead opposite said second prod, a pin socket cooperative with said pin, and a contact terminal on said mounting plate electrically connected to said socket and to said other side of said instrument coil.

6. Electrical testing apparatus as defined in claim 1 and which further includes a second circuit element in said hollow prod handle connected in series with the first said circuit element, one of said circuit elements being a dry cell battery and the other a resistor adapting said testing apparatus for use as an ohmmeter.

7. Electrical testing apparatus as defined in claim 1 wherein said circuit element is constituted by a cartridge containing a rectifier unit adapting said apparatus for measurement of alternating current voltages.

8. Electrical testing apparatus as defined in claim 1 wherein said circuit element is constituted by a cartridge including series connected rectifier and resistor units adapting said apparatus for measurement of alternating current voltages.

9. Electrical testing apparatus comprising a pair of prods to be applied manually to points of a circuit to be tested, handles for said prods, at least one of said handles being a hollow cylinder threaded internally at one end thereof, a mounting plate screwed into the threaded end of said hollow handle, an electrical measuring instrument supported within said hollow handle by said mounting plate, said instrument being of the permanent magnet core-movable coil type, a cap member screwed into the threaded end of said hollow handle, a pin socket in said cap member, connections between said socket and one end of said instrument coil, a detachable closure member at the other end of said hollow handle having one of said prods secured thereto, circuit elements connecting the other end of said instrument coil with the prod secured to said closure member, and a flexible lead having at one end thereof a pin terminal insertable in said socket, the other end of said lead being electrically connected with said other prod.

10. Electrical testing apparatus comprising a hollow prod handle, a mounting plate of insulating material removably disposed within said handle at one end thereof, an electrical measuring instrument of the permanent magnet core-movable coil type depending from said mounting plate, said instrument including a sub-base of insulating material, a coiled spring carried by and depending from said sub-base, an electrical connection between the upper end of said spring and one side of said instrument coil, a removable end closure for the other end of said handle, a prod carried by said closure member, a pair of circuit elements removably disposed within said handle, said elements being series connected between the lower end of said spring and said prod when said closure member is attached to said handle, a second prod terminating one end of a flexible lead, a contact pin terminating the opposite end of said lead, a pin socket cooperative with said pin, a contact terminal on said mounting plate electrically connected to said socket and to the other side of said instrument coil, a second pin socket electrically connected with a second contact terminal on said mounting plate, electrical connecting means extending between said second contact terminal and a point intermediate said pair of circuit elements, a third pin socket electrically connected with a third contact terminal on said mounting plate, electrical connecting means extending between said third contact terminal and the side of said instrument coil connected to said spring, and a second flexible lead having contact pins at the terminal ends thereof cooperative with said second and third pin sockets.

11. Electrical testing apparatus comprising a pair of prods to be applied manually to points of a circuit to be tested, handles for said prods, at least one of said handles being hollow and cylindrical with its associated prod projecting axially from one end thereof, a removable closure member for the prod end of said hollow handle and which carries said prod, an electrical measuring instrument supported within said hollow handle at the other end thereof, said instrument being of the permanent magnet core-movable coil type, and circuit elements connecting said instrument coil in series with said prods, one of said circuit elements being a flexible lead extending between said handles, and another of said circuit elements being a coiled contact spring secured to said instrument and extending axially from one end thereof with one end of said spring being electrically connected to one side of said instrument coil.

12. Electrical testing apparatus as defined in claim 11 wherein said flexible lead includes a pin contact at one end thereof engageable in a pin socket carried by said hollow handle at the instrument end and electrically connected to the other side of said instrument coil.

13. Electrical testing apparatus comprising a hollow prod handle of cylindrical shell form, a lower end closure for said handle carrying a test prod, an electrical measuring instrument including a cylindrical permanent magnet core and a movable coil coaxial with said core, means supporting said instrument within and at the upper end of said prod handle, a plurality of pin sockets on said prod handle selectively connected to said plurality of circuit elements, a flexible lead terminating in a cooperating prod, and a pin terminal at one end of said lead insertable in a desired one of said sockets to include one or more of said circuit elements in series circuit with the coil of said measuring instrument.

ANTHONY H. LAMB.

REFERENCES CITED

The following references are of record in the file of this patent:

UNITED STATES PATENTS

| Number | Name | Date |
|---|---|---|
| 1,528,709 | Trimble | Mar. 3, 1925 |
| 1,593,024 | Macadie | July 20, 1926 |
| 1,606,063 | Edwards | Nov. 9, 1926 |
| 1,615,788 | Feldkamp | Jan. 25, 1927 |
| 1,707,051 | Colosoff | Mar. 26, 1929 |
| 1,888,906 | Colosoff | Nov. 22, 1932 |
| 1,957,802 | Rabezzana | May 8, 1934 |
| 2,156,319 | Steele | May 2, 1939 |
| 2,231,660 | Carlotti et al. | Feb. 11, 1941 |
| 2,290,760 | Mehaffie | July 21, 1942 |
| 2,413,521 | Roskilly | Dec. 31, 1946 |
| 2,418,872 | Fisher | Apr. 15, 1947 |

OTHER REFERENCES

Electrical Review, Feb. 5, 1926.
Radio and Television, Feb. 1940.
Popular Mechanics, Sept. 1944.
Electrical World, August 8, 1925.